(12) United States Patent
Nakazawa

(10) Patent No.: US 8,570,610 B2
(45) Date of Patent: Oct. 29, 2013

(54) INFORMATION PROCESSING APPARATUS, INFORMATION PROCESSING METHOD AND COMPUTER READABLE MEDIUM FOR DESIGNATING A REGION OF REDUCED DOCUMENT ON DISPLAY AND CREATING IMAGE CORRESPONDING TO THE DESIGNATED REGION

(75) Inventor: Shinsuke Nakazawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 372 days.

(21) Appl. No.: 12/883,868

(22) Filed: Sep. 16, 2010

(65) Prior Publication Data

US 2011/0188094 A1    Aug. 4, 2011

(30) Foreign Application Priority Data

Feb. 2, 2010   (JP) ................. 2010-021356

(51) Int. Cl.
 - *H04N 1/387* (2006.01)
 - *H04N 1/393* (2006.01)
 - *H04N 1/04* (2006.01)
 - *H04N 1/46* (2006.01)
 - *G06F 17/00* (2006.01)
 - *G06F 17/20* (2006.01)
 - *G06F 17/22* (2006.01)

(52) U.S. Cl.
USPC ........... 358/453; 358/450; 358/451; 358/474; 358/538; 715/200; 715/246; 715/277

(58) Field of Classification Search
USPC .......... 358/474, 1.6, 1.2, 1.16, 1.15, 1.1, 451, 358/453, 450, 448, 537, 538, 540, 501, 358/1.18, 3.11, 1.9; 345/660, 594, 601, 345/618, 625, 634, 655, 659, 670, 157, 160, 345/161, 163, 167, 11, 30; 715/273, 200, 715/243, 246, 252, 277, 721, 783, 800, 815, 715/856; 382/166, 171, 173, 175, 232, 296

See application file for complete search history.

(56) References Cited

U.S. PATENT DOCUMENTS

| | | | |
|---|---|---|---|
| 6,915,489 B2* | 7/2005 | Gargi | 715/790 |
| 2001/0024195 A1* | 9/2001 | Hayakawa | 345/173 |
| 2005/0168763 A1* | 8/2005 | Higuchi et al. | 358/1.13 |
| 2005/0195221 A1* | 9/2005 | Berger et al. | 345/660 |
| 2008/0129757 A1* | 6/2008 | Tanaka et al. | 345/660 |
| 2009/0254830 A9* | 10/2009 | Reid et al. | 715/731 |

FOREIGN PATENT DOCUMENTS

| | | |
|---|---|---|
| JP | 2005-202635 A | 7/2005 |
| JP | 2006-301421 A | 11/2006 |
| JP | 2008-305240 A | 12/2008 |

* cited by examiner

*Primary Examiner* — Ngo Nguyen
*Assistant Examiner* — Ngon Nguyen
(74) *Attorney, Agent, or Firm* — Sughrue Mion, PLLC

(57) ABSTRACT

An information processing apparatus includes: a document acceptance unit that accepts a plurality of documents; a reduction and display unit that reduces and displays the documents accepted by the document acceptance unit; a region designation unit that designates a region for one of the documents displayed by the reduction and display unit; a region image creation unit that creates an image corresponding to the region designated by the region designation unit for each of the documents accepted by the document acceptance unit based on a size of each of the documents displayed by the reduction and display unit; and a region image display unit that displays the images created by the region image creation unit in respective document positions corresponding to the documents displayed by the reduction and display unit.

8 Claims, 16 Drawing Sheets

COMPARATIVE EXAMPLE

COMPARATIVE EXAMPLE

INFORMATION PROCESSING APPARATUS, INFORMATION PROCESSING METHOD AND COMPUTER READABLE MEDIUM FOR DESIGNATING A REGION OF REDUCED DOCUMENT ON DISPLAY AND CREATING IMAGE CORRESPONDING TO THE DESIGNATED REGION

CROSS-REFERENCE TO RELATED APPLICATIONS

This application is based on and claims priority under 35 USC 119 from Japanese Patent Application No. 2010-021356 filed on Feb. 2, 2010.

BACKGROUND

Technical Field

The present invention relates to an information processing apparatus, an information processing method and a computer readable medium.

SUMMARY

According to an aspect of the invention, an information processing apparatus includes: a document acceptance unit that accepts a plurality of documents; a reduction and display unit that reduces and displays the documents accepted by the document acceptance unit; a region designation unit that designates a region for one of the documents displayed by the reduction and display unit; a region image creation unit that creates an image corresponding to the region designated by the region designation unit for each of the documents accepted by the document acceptance unit based on a size of each of the documents displayed by the reduction and display unit; and a region image display unit that displays the images created by the region image creation unit in respective document positions corresponding to the documents displayed by the reduction and display unit.

BRIEF DESCRIPTION OF THE DRAWINGS

Exemplary embodiment(s) of the present invention will be described in detail based on the following figures, wherein.

DETAILED DESCRIPTION

Display of thumbnail images for utilizing an exemplary embodiment of the invention will be described before description of the embodiment. Thumbnail images are images displayed not in the same sizes as those of original documents displayed on a screen but in reduced sizes in order to display a list of contents of documents.

Figure 3:
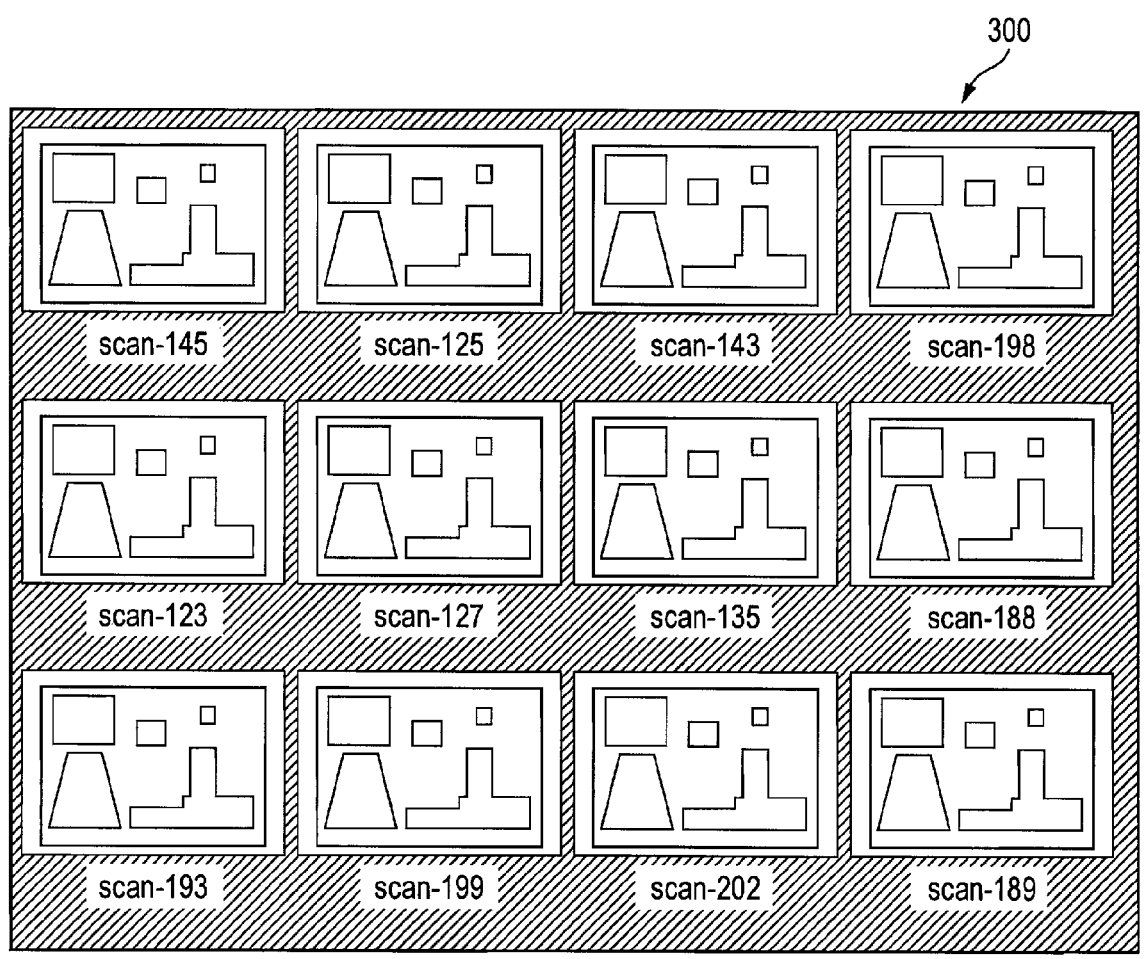
FIG. 3 is an explanatory view showing an example of display of thumbnail images.

FIG. 3 is an explanatory view showing an example of display of thumbnail images. In this example, thumbnail images of documents stored in a certain file are displayed on a screen 300. When, for example, documents are as large in size as drawings and different portions of the documents are as small in number as documents which are managed as editions of a document, display of the different portions may be hard to be recognized when the documents are displayed as thumbnail images.

Figure 15:
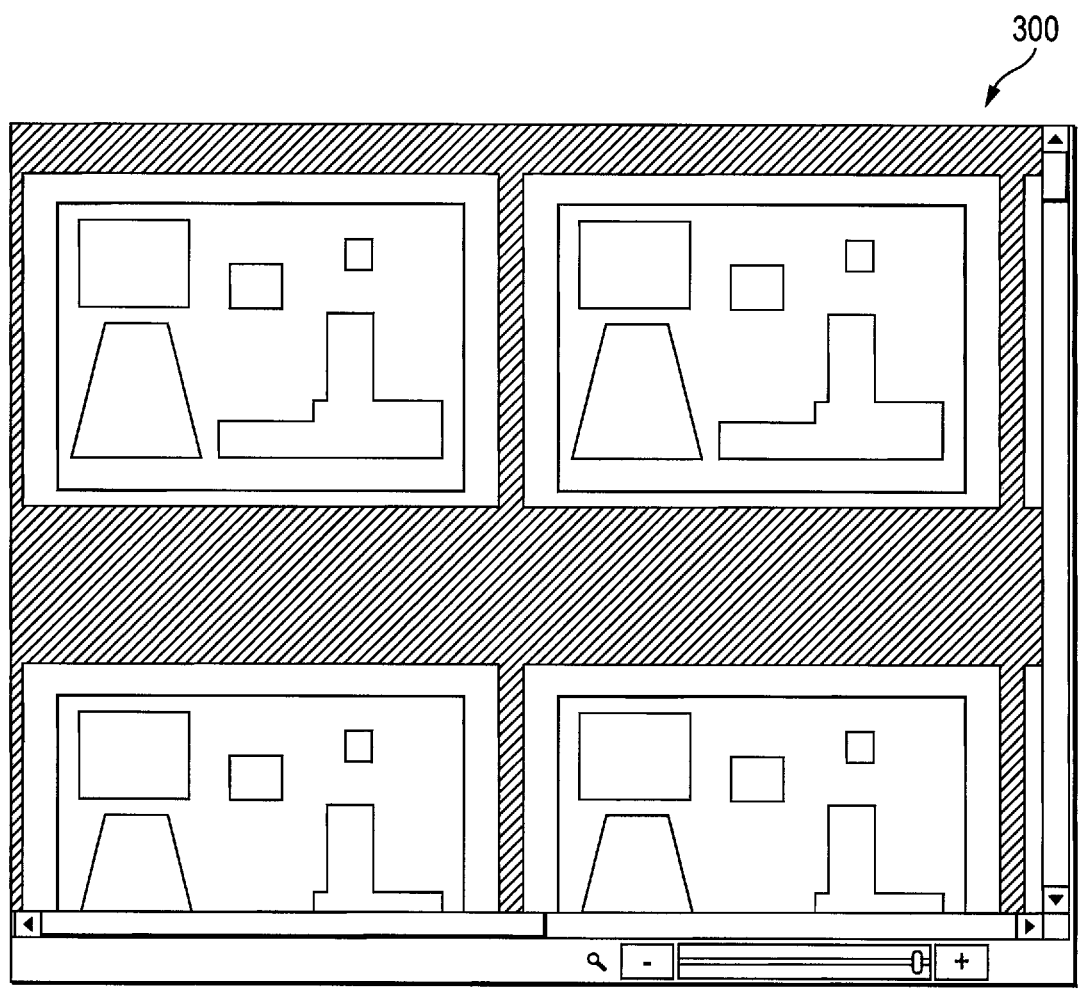
FIG. 15 is an explanatory view showing an example of enlarged display of respective thumbnail images.

Therefore, thumbnail images per se may be enlarged and displayed. FIG. 15 is an explanatory view showing an example of enlarged display of respective thumbnail images. In enlarged display of thumbnail images, each thumbnail image region per se occupied on the screen 300 becomes large or the number of documents allowed to be displayed on one scene becomes small when thumbnail images are enlarged excessively in the case where different portions of documents cannot be confirmed unless the enlarging ratio is increased.

Figure 16:
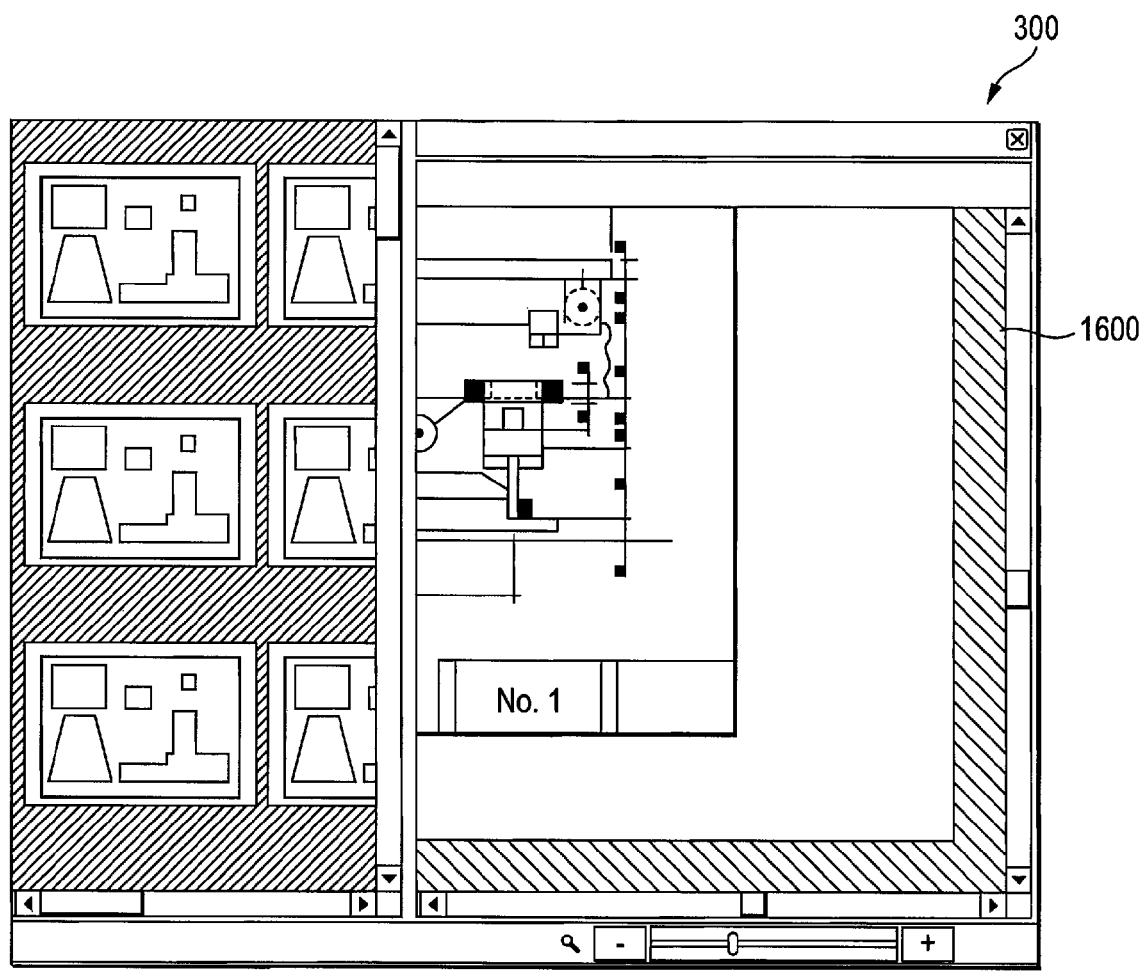
FIG. 16 is an explanatory view showing an example in the case where a document is displayed based on one of thumbnail images.

On the other occasion, documents per se may be displayed in original sizes. FIG. 16 is an explanatory view showing an example of the case where documents are displayed based on thumbnail images. When one document per se is displayed, the document display region 1600 occupied in the screen 300 becomes so large that it is difficult to display a plurality of documents simultaneously so that it is necessary to display the documents one by one.

A user uses the display of these documents, for example, for confirmation of contents of the documents so that the display of these documents is stored in a target folder where these documents should be stored.

A preferred embodiment of the invention will be described below with reference to the drawings.

Figure 1:
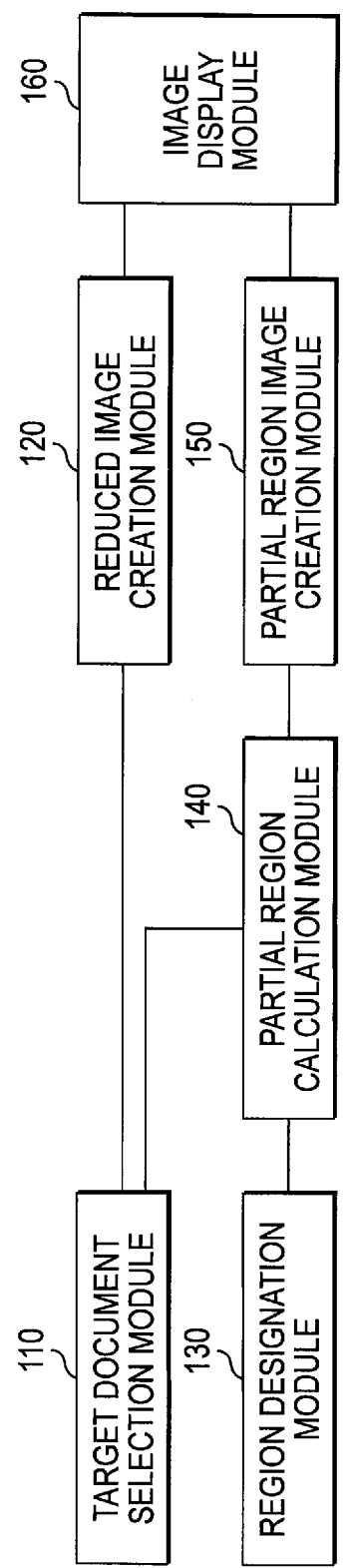
FIG. 1 is a conceptual module configuration diagram concerned with an example of configuration of an embodiment of the invention.

FIG. 1 is a conceptual module configuration diagram showing an example of configuration of the embodiment.

The term "module" generally means a logically separable component such as software (computer program) or hardware. Accordingly, modules in the embodiment mean not only modules in computer programs but also modules in hardware configuration. Therefore, description of the embodiment also serves as description of a computer program, a system and a method. Although the terms "store" and "control . . . to store" and terms equivalent to these are used for the sake of description, these terms mean store in a storage device or control the storage device to store when the subject of the embodiment is a computer program. Although modules may have one-to-one correspondence with functions, one module may be formed from one program, a plurality of modules may be formed from one program or one module may be formed from a plurality of programs when modules are mounted. Moreover, a plurality of modules may be executed by one computer or one module may be executed by a plurality of computers in a distributed or parallel computer environment. Incidentally, one module may include any other module. The term "connection" is hereinafter used not only for physical connection but also for logical connection (data exchange, instruction, reference relation between data, or the like).

A system or apparatus may be formed from a plurality of computers, pieces of hardware, apparatuses, etc. connected to one another by communication means such as a network (inclusive of one-to-one correspondence communication connection) or may be achieved by one computer, one piece of hardware, one apparatus, etc. The terms "apparatus" and "system" are used as terms synonymous with each other. It is a matter of course that the "system" does not include any social "mechanism" (social system) which is an artificial arrangement. The term "predetermined" means a thing determined before target processing. The term "predetermined" is used, inclusive of a thing determined in accordance with a situation/state at that time or in accordance with a situation/state until that time not only before start of processing according to the embodiment but also before target processing even after start of processing according to the embodiment.

Target information is read from a storage device in accordance with a process due to each module or in accordance with each process when processes are performed in one module. After the process is performed, a result of the process is written in the storage device. Accordingly, description about reading from the storage device before processing and writing into the storage device after processing may be omitted. Incidentally, the concept "storage device" herein may include a hard disk, an RAM (Random Access Memory), an external storage device, a storage device through a communication line, a register in a CPU (Central Processing Unit), etc.

An information processing apparatus according to the embodiment is provided for displaying thumbnail images of documents. As shown in the example of FIG. 1, the information processing apparatus includes a target document selection module 110, a reduced image creation module 120, a region designation module 130, a partial region calculation module 140, a partial region image creation module 150, and an image display module 160.

The target document selection module 110 is connected to the reduced image creation module 120 and the partial region calculation module 140 and accepts a plurality of documents. Then, the target document selection module 110 delivers the plurality of documents to the reduced image creation module 120 and the partial region calculation module 140. Incidentally, a document is electronic data formed from any one of text data, graphical data, an image, etc. or a combination of these and includes electronic data such as motion images, audio, etc. as the case may be. A document is a subject of storage, edition, retrieval, etc. which can be exchanged as an individual unit between systems or users and includes a thing analogical to these. Specifically, the concept "acceptance of a plurality of documents" includes selection of a plurality of documents, designation of a folder where a plurality of documents are stored, etc. The selection of a plurality of documents and the designation of a folder may be performed based on user's operation or may be predetermined. The concept "acceptance of documents" includes reading of documents stored in a recording medium (including a recording medium built in a computer, a recording medium connected through a network, etc.) such as a hard disk. When documents are images, the concept "acceptance of documents" further includes reading of images by a scanner, a camera, etc., and reception of images from an external device through a communication line such as a facsimile machine. The images may be binary images or multi-valued images (including color images). The accepted document may be one page or a plurality of pages. As for contents of documents, documents may be documents used for designing of drawings etc., documents used for business, advertising brochures, etc.

The target document selection module 110 may be separated into a plurality of target document selection modules. Each of the target document selection modules accepts a plurality of documents. Incidentally, separation into a plurality of target document selection modules may mean not only physical existence of a plurality of target document selection modules but also time-series acceptance of a plurality of document groups by one target document selection module 110. For example, configuration may be made so that one target document selection module designates a folder A and the other target document selection module designates a folder B or configuration may be made so that one target document selection module 110 designates a folder A and then the target document selection module 110 designates a folder B.

The reduced image creation module 120 is connected to the target document selection module 110 and the image display module 160 and reduces documents accepted by the target document selection module 110. That is, the reduced image creation module 120 creates thumbnail images to be displayed on a screen, and then delivers the reduced images to the image display module 160. When, for example, each document is formed from text data and graphical data, the reduced image creation module 120 creates image data for displaying (or printing) these data and reduces the image data. The reduction ratio may be set as a predetermined value or may be set in accordance with each thumbnail image when the size of the thumbnail image displayed on a screen is determined. When a thumbnail image has been already added to each document (for example, a thumbnail image may be added as a property), the thumbnail image may be extracted.

The image display module 160 is connected to the reduced image creation module 120 and the partial region image creation module 150 and displays reduced images created by the reduced image creation module 120 or images created by the partial region image creation module 150 on the screen. For example, thumbnail images are displayed as shown in FIG. 3. The term "display" means display on a screen. A scroll bar or the like may be used so that thumbnail images are displayed in a region not smaller than the screen. When images created by the partial region image creation module 150 are displayed on a screen, the images are displayed in positions of documents corresponding to the thumbnail images which have been already displayed by the reduced image creation module 120. That is, the thumbnail images are replaced by images created by the partial region image creation module 150. Therefore, the size of each image created by the partial region image creation module 150 is the same as the size of each thumbnail image and the display position of each image created by the partial region image creation module 150 is the same as the display position of each thumbnail image.

When designation of a region by the region designation module 130 is performed in accordance with a user's operation, the image display module 160 displays an image of the region created by the partial region image creation module 150 on a screen in the middle of the user's operation. The image display module 160 is provided for displaying images of regions for other documents in accordance with the operation in the middle of the operation. That is, the image display module 160 is provided for so-called real-time display.

When a document indicated by an image displayed by the image display module 160 is copied or moved from a first document group to a second document group, the image display module 160 displays the image of the document of the first document group in the second document group. When, for example, a document in a folder A is copied or moved to a folder B in the case where the document in the folder A is displayed as an image created by the partial region image creation module 150 on a screen while a document in the folder B is displayed as a thumbnail image created by the reduced image creation module 120 on the same screen, the document copied or moved to the folder B is displayed as an image created by the partial region image creation module 150 on the screen. That is, the document is copied or moved to a place of the other display format while the display format of the copied or moved document remains unchanged. Therefore, information concerned with the display format is copied or moved with the document. Information concerned with the display format will be described later as a display format information table 1300.

The region designation module 130 is connected to the partial region calculation module 140 and designates a region for one of documents displayed by the image display module 160. The region designation module 130 delivers display format information included in the designated region to the partial region calculation module 140. Although a plurality of thumbnail images are displayed on a screen, the region designation module 130 designates a region for one of the thumbnail images. Region designation is performed in accordance with a user's operation using a mouse, a keyboard, a touch panel or the like. Alternatively, a predetermined region may be used. The designated region is displayed in place of a thumbnail image which has been already displayed on the screen. Although the region is designated based on the user's operation etc., the region is generally designated to include a place different from the other documents.

When region designation is performed based on the user's operation, one of pages of the displayed document may be designated as the region, and the thumbnail image of the displayed can be rotated.

The partial region calculation module 140 is connected to the target document selection module 110, the region designation module 130 and the partial region image creation module 150. The partial region calculation module 140 receives display format information including the region designated by the region designation module 130 and calculates display format information of each document for creating an image in place of the thumbnail image of each document of a document group accepted by the target document selection module 110. Then, the partial region calculation module 140 delivers a result of calculation concerned with a partial region to the partial region image creation module 150. The partial region calculation module 140 calculates display format information including the region designated by the region designation module 130 for each of the documents accepted by the target document selection module 110 based on the size of the thumbnail image (image created by the reduced image creation module 120) of each document displayed by the image display module 160.

When documents are equal in size (e.g. A1 size etc.), document orientation (portrait (vertically long display) or landscape (horizontally long display)) and the number of pages, display format information is created while the same region of the same page as the region designated by the region designation module 130 is used as a target. Accordingly, when the designated region is on page 2 or on a page after page 2, the partial region calculation module 140 creates display format information of a corresponding page of each document. Incidentally, the corresponding page means the same page when documents are equal in the number of pages, the same page when documents are different in the number of pages but have the same page, and the relatively same page to the number of pages when documents are different in the number of pages and do not have the same page. When, for example, the number of pages in the document whose region is designated is 20 and the page in which the region is designated is page 10, page 5 of the other document having 10 pages is set as a target page. Display format information will be described later, for example, as a display format information table 1300. Although a region of the same coordinates as those of the designated region is displayed when documents are equal in size and orientation, a region of the relatively same coordinates as those of the designated region may be used likewise when documents are different in either or both of size and orientation.

The partial region calculation module 140 may be configured so that an image of a corresponding region in each rotated document is created when the designated region is a region in a rotated document. When, for example, a region is designated in a state where a document for designating the region is rotated clockwise by 90 degrees, the partial region calculation module 140 calculates information about a corresponding display format in the case where another document is rotated clockwise by 90 degrees.

When designation of a region by the region designation module 130 is performed in accordance with a user's operation, the partial region calculation module 140 may create display format information in each region in the middle of the user's operation based on the region designation module 130.

The partial region image creation module 150 is connected to the partial region calculation module 140 and the image display module 160. The partial region image creation module 150 creates an image of a region of each document corresponding to the designated region in accordance with the display format information calculated by the partial region calculation module 140. Then, the partial region image creation module 150 delivers the created region image to the image display module 160.

When designation of a region by the region designation module 130 is performed in accordance with a user's operation, the partial region image creation module 150 creates an image of each region by using display format information in the region in the middle of the user's operation based on the partial region calculation module 140.

When a document indicated by an image displayed by the image display module 160 is copied or moved from the first document group to the second document group, the partial region image creation module 150 creates an image equivalent to the displayed region of the copied or moved document for the second document group except the copied or moved document in the second document group. When, for example, a document in a folder A is copied or moved to a folder B in the condition that documents in the folder A are displayed on a screen as images created by the partial region image creation module 150 while documents in the folder B are displayed on the same screen as thumbnail images created by the reduced image creation module 120, the copied or moved document is displayed on the screen as an image created by the partial region image creation module 150 in the folder B and further documents in the folder B are made equivalent to documents in the folder A. That is, a document is copied or moved to a place of another display format without change of the display format of the copied or moved document and further the display format of each document for the destination to which the document is copied or moved is changed to the display format of the copied or moved document. Therefore, the display format information is copied or moved together with the document, so that the partial region image creation module 150 creates an image of a region for each document in the destination in accordance with the display format. The display format information will be described later as a display format information table 1300. Then, the image display module 160 displays the image created by the partial region image creation module 150 in the second document group.

When a document is copied or moved from the second document group to the first document group indicated by the image displayed by the image display module 160, the partial region image creation module 150 creates an image corresponding to the region designated by the region designation module 130 for the copied or moved document in the first document group. When, for example, a document in a folder B is copied or moved to a folder A in the condition that documents in the folder A are displayed on a screen as images created by the partial region image creation module 150 while documents in the folder B are displayed on the same screen as thumbnail images created by the reduced image creation module 120, the copied or moved document is displayed on the screen as an image created by the partial region image creation module 150 in the folder A. That is, conversely to the above description, when a document is copied or moved to a place of another display format, the display format of the copied or moved document is changed to the display format of the destination document group. Therefore, the partial region image creation module 150 creates an image of a region for the copied or moved document in accordance with the display format information of each document in the destination document group. The display format information will be described later as a display format information table 1300. Then, the image display module 160 displays the image created by the partial region image creation module 150 in the first document group.

Figure 2:
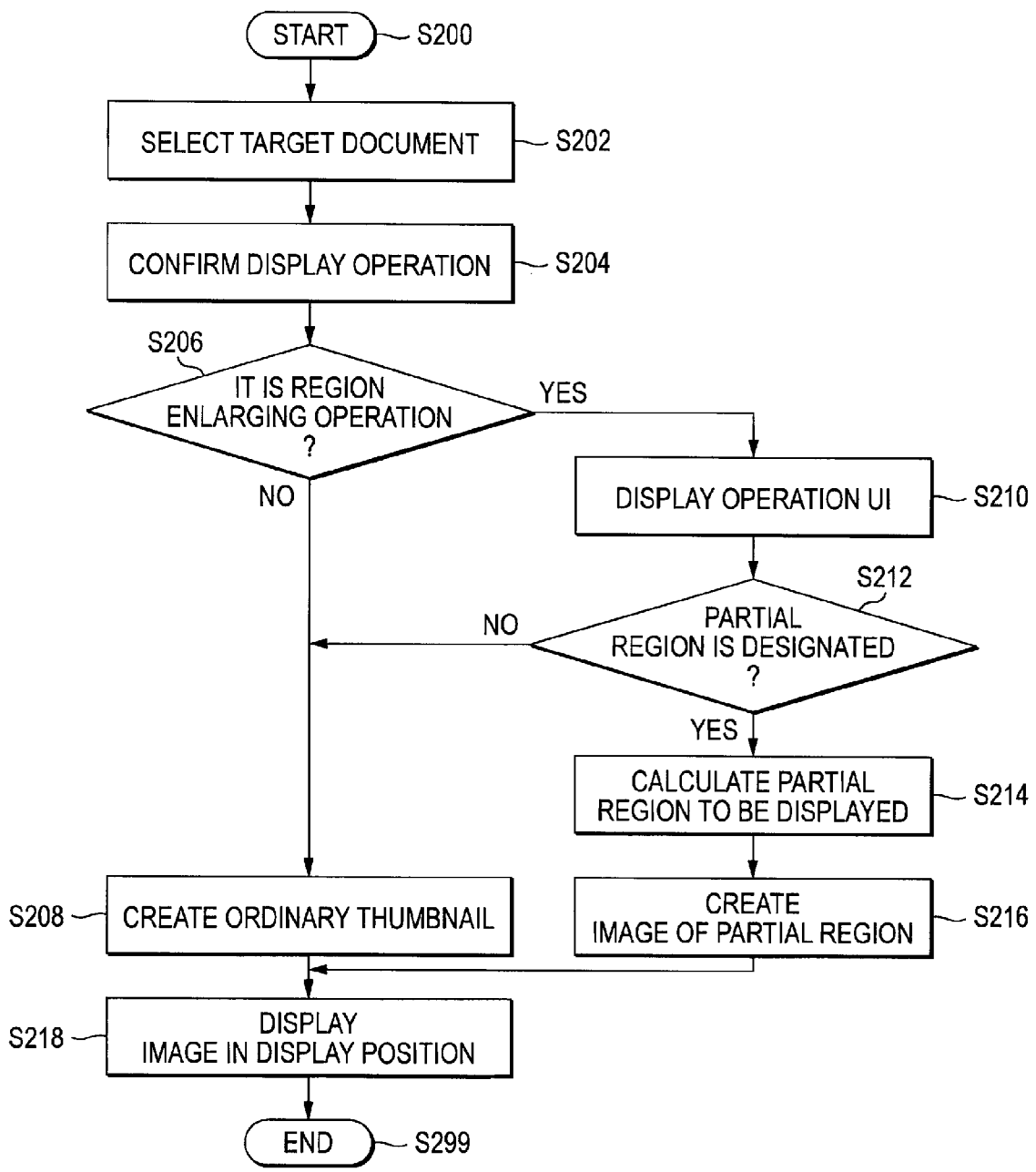
FIG. 2 is a flow chart showing an example of processing according to the embodiment.

FIG. 2 is a flow chart showing an example of processing according to the embodiment.

In step S202, the target document selection module 110 selects a target document. For example, a folder where the target document is stored is designated.

In step S204, the target document selection module 110 confirms display operation. Display of the selected document is confirmed. When display of the selected document is confirmed, the processing goes to step S206.

In step S206, the region designation module 130 determines whether there is a region enlarging operation or not. When there is a region enlarging operation, the processing goes to step S210. Otherwise, the processing goes to step S208. Incidentally, in initial display, the processing generally goes to step S208 in order to display a thumbnail image as a default.

In step S208, the reduced image creation module 120 creates an ordinary thumbnail image.

In step S210, the region designation module 130 displays an operation UI.

In step S212, the region designation module 130 determines whether a partial region is designated or not. When a partial region is designated, the processing goes to step S214. Otherwise, the processing goes to S208.

In step S214, the partial region calculation module 140 calculates a partial region to be displayed.

In step S216, the partial region image creation module 150 creates an image of the partial region.

In step S218, the image display module 160 displays the image created by the step S208 or S216 in a display position.

FIG. 3 is an explanatory view showing an example of display of thumbnail images. The reduced image creation module 120 creates thumbnail images from a document group selected by the target document selection module 110, and then the image display module 160 displays the thumbnail images on a screen 300. FIG. 3 shows an example of processing in steps S208 and 218 in the flow chart shown in FIG. 2.

Figure 4:
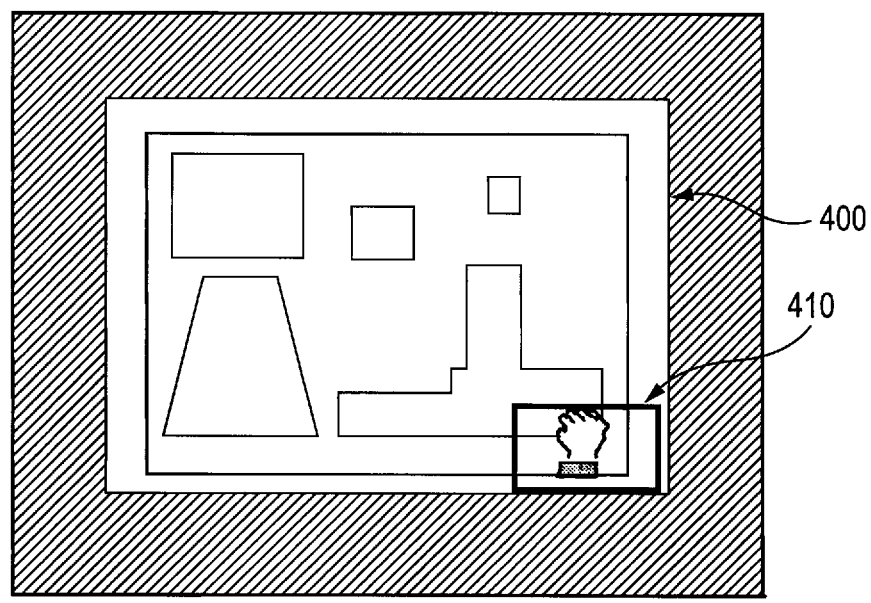
FIG. 4 is an explanatory view showing an example of processing for designating a region for a thumbnail image.

FIG. 4 is an explanatory view showing an example of processing for designating a region for a thumbnail image. The region designation module 130 displays a region designation mark 410 for a target document 400 displayed as a thumbnail image and designates a region to be displayed in place of the thumbnail image in accordance with a user's operation. A region surrounded by a rectangle of the region designation mark 410 is designated as a region to be displayed. In this example, a region which is in the lower right of FIG. 4 and where a drawing number, etc. is written is designated. Alternatively, a predetermined region may be designated in accordance with the class of the document. For example, in the case of a drawing, a drawing number in the lower right region may be designated. For example, in the case of a contract document, a contractant name in the upper center may be designated. For example, in the case of a payment slip, an amount of money in the upper right may be designated.

Figure 13:
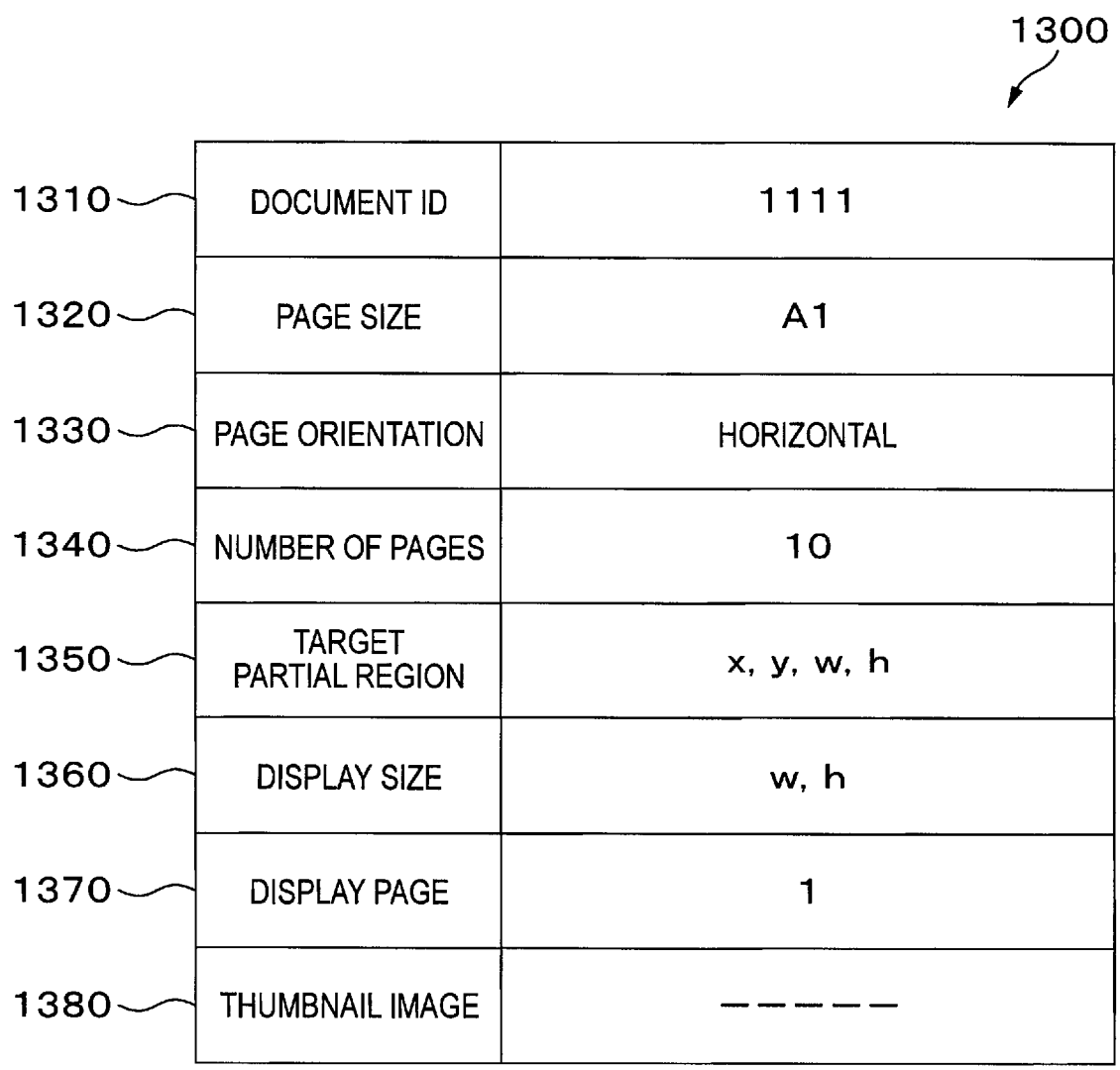
FIG. 13 is an explanatory view showing an example of data structure of a display format information table.

Then, the partial region calculation module 140 extracts the thus designated region as display format information. FIG. 13 shows an example of data structure of a display format information table 1300 as a specific example of the display format information.

The display format information table 1300 has a document ID field 1310, a page size field 1320, a page orientation field 1330, a number-of-pages field 1340, a target partial region field 1350, a display size field 1360, a display page field 1370, and a thumbnail image field 1380. The document ID field 1310 stores a document ID (IDentification) for identifying the target document 400 uniquely. A document name or the like may be used in place of the document ID. The page size field 1320 stores a page size of the target document 400. A page size may be stored in accordance with each page in order to support a document containing different page sizes. The page orientation field 1330 stores a page orientation of the target document 400. A page orientation may be stored in accordance with each page in order to support a document containing different page orientations. The number-of-pages field 1340 stores the number of pages in the target document 400. The target partial region field 1350 stores a region designated by the region designation mark 410. More specifically, the coordinates of the upper left point in the rectangular region and the width and height of the rectangular region are stored. Of course, a combination of the coordinates of the upper left point and the coordinates of the lower right point in the rectangular region may be stored. The display size field 1360 stores the size (width and height) of the target document 400 to be displayed in the screen 300. The display page field 1370 stores a page containing the region designated by the region designation mark 410. In the example shown in FIG. 4, "1" is stored in the display page field 1370. The thumbnail image field 1380 stores the thumbnail image of the target document 400 created by the reduced image creation module 120. An address (URL: Uniform Resource Locator) etc. in a storage device which stores the thumbnail image may be used in place of the thumbnail image.

Figure 5:
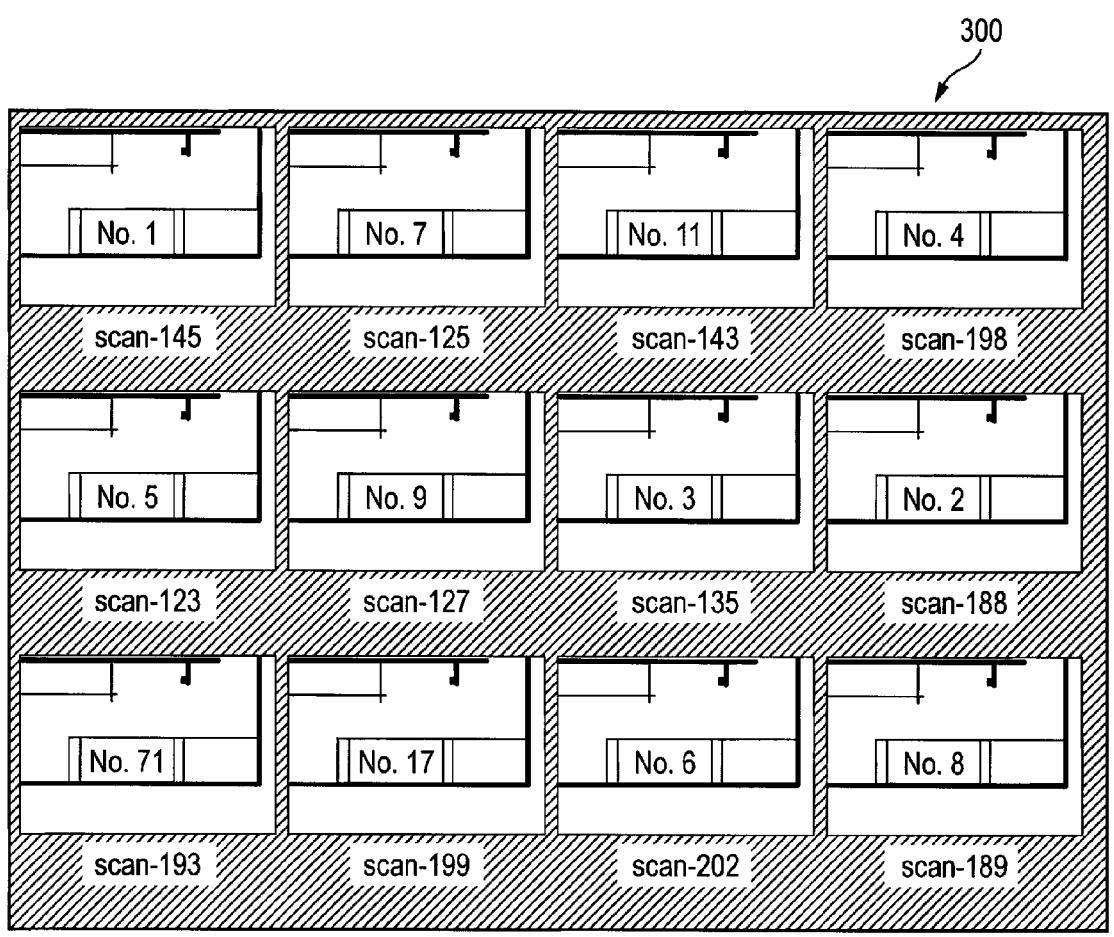
FIG. 5 is an explanatory view showing an example of enlarged display of partial region images.

FIG. 5 is an explanatory view showing an example of enlarged display of partial region images. With respect to a region designated by the region designation mark 410 shown in the example of FIG. 4, the partial region image creation module 150 creates an image of a corresponding region of each document and the image display module 160 displays the image on the screen 300. Incidentally, the term "enlarged display" mentioned herein means that the image is displayed while enlarged compared with the thumbnail image. That is, the image of the region in the document is not always enlarged so that the size of the region may be reduced/unchanged/enlarged. As is obvious from comparison with display of thumbnail images shown in the example of FIG. 3, the size of each thumbnail image and the position where each thumbnail image is displayed are not changed. That is, the image display module 160 displays the image of the region of each document created by the partial region image creation module 150 in the same position and size as those of a corresponding thumbnail image which has been displayed.

Figure 6:
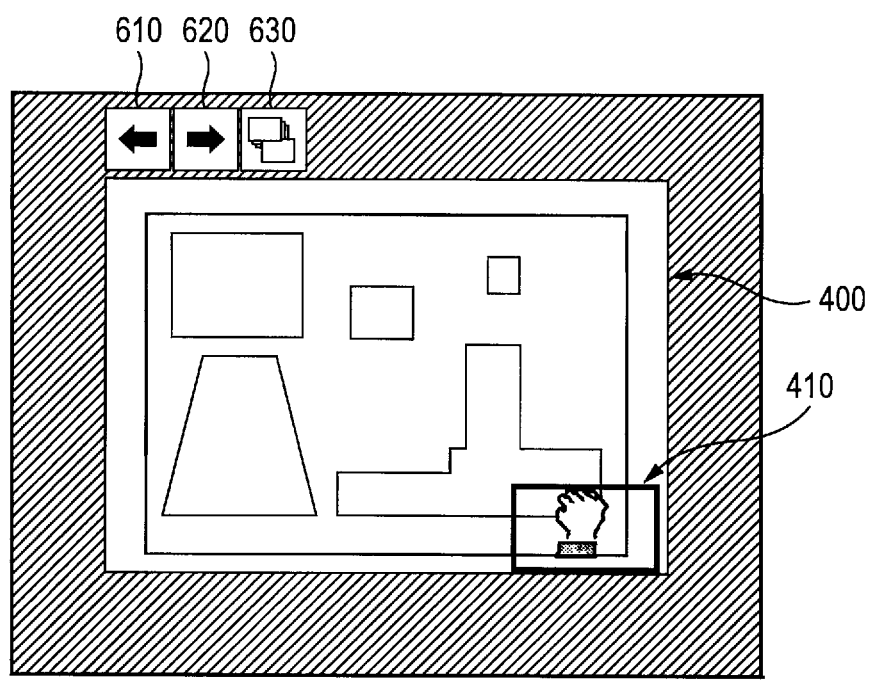
FIG. 6 is an explanatory view showing an example of processing for designating a region for a thumbnail image.

FIG. 6 is an explanatory view showing an example of processing for designating a region for a thumbnail image. The region designation module 130 may display a previous page button 610, a next page button 620 and a rotation button 630 in addition to the region designation mark 410 for the target document 400. The page for designating the region may be changed in accordance with a user's operation on the previous page button 610 and the next page button 620, and the page orientation may be changed based on page rotation in accordance with a user's operation on the rotation button 630. The change of the page is reflected on the display page field 1370 of the display format information table 1300, and the change of the page orientation is reflected on the page orientation field 1330. Of course, the change based on the region designation mark 410 is reflected on the target partial region field 1350.

Figure 7:
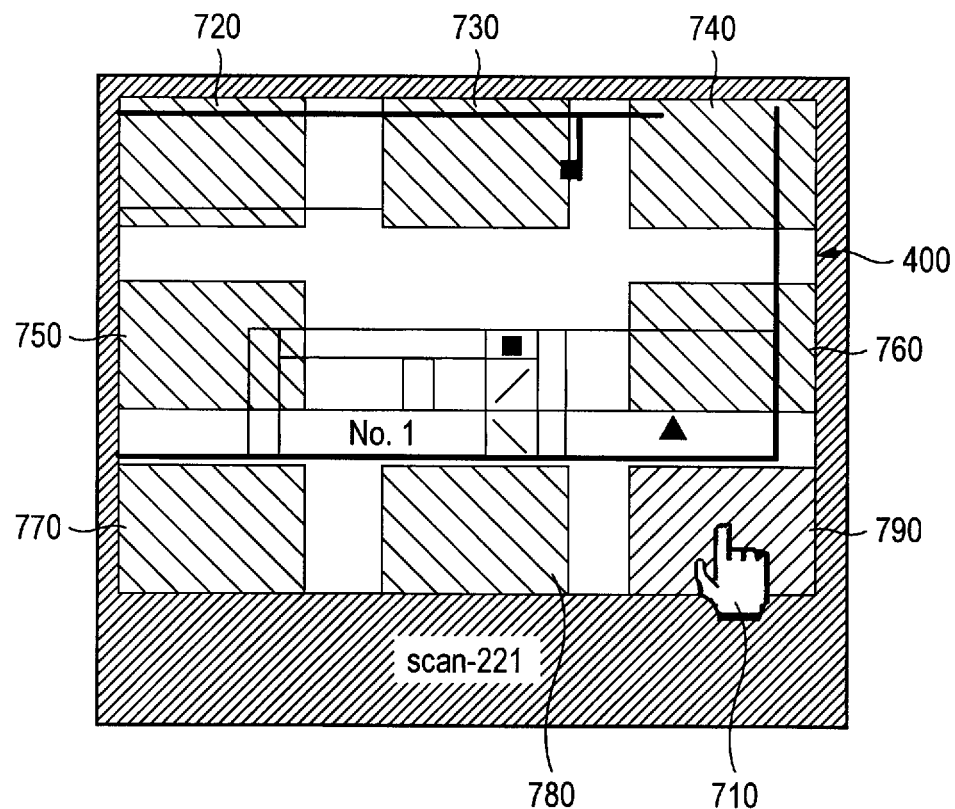
FIG. 7 is an explanatory view showing an example of processing for designating a region for a thumbnail image.

FIG. 7 is an explanatory view showing an example of processing for designating a region for a thumbnail image. The region designation module 130 may be configured so that a predetermined region can be selected as a region to be designated. For example, as shown in the example of FIG. 7, regions 720 to 790 allowed to be selected may be displayed for the thumbnail image of the target document 400. In the example of FIG. 7, there is shown a state after the selectable region 790 is selected by a user's operation on a region designation mark 710.

Figure 8:
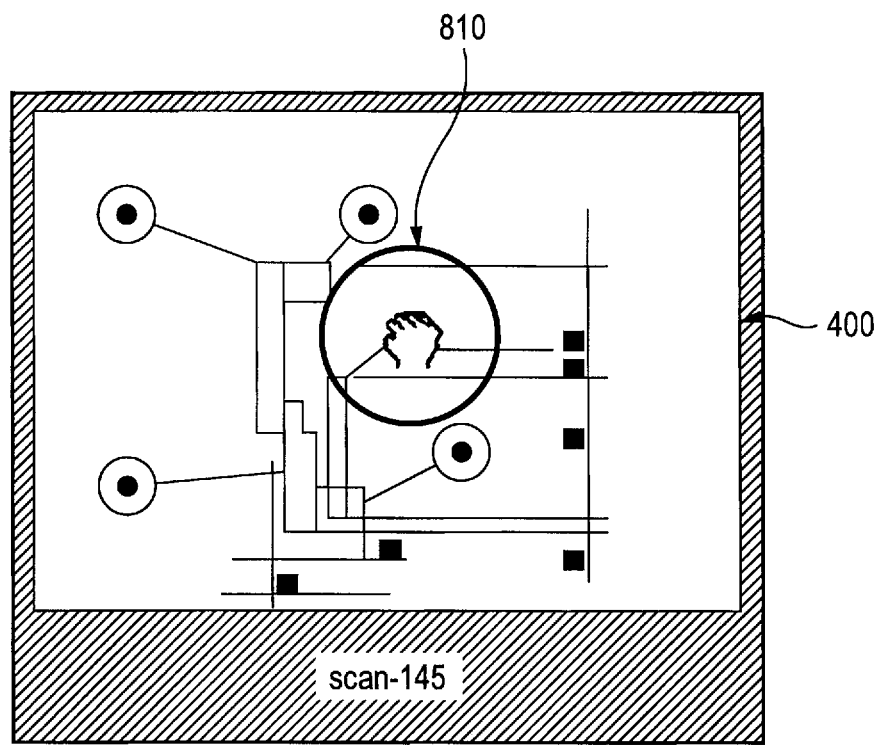
FIG. 8 is an explanatory view showing an example of processing for designating a region for a thumbnail image.
Figure 9:
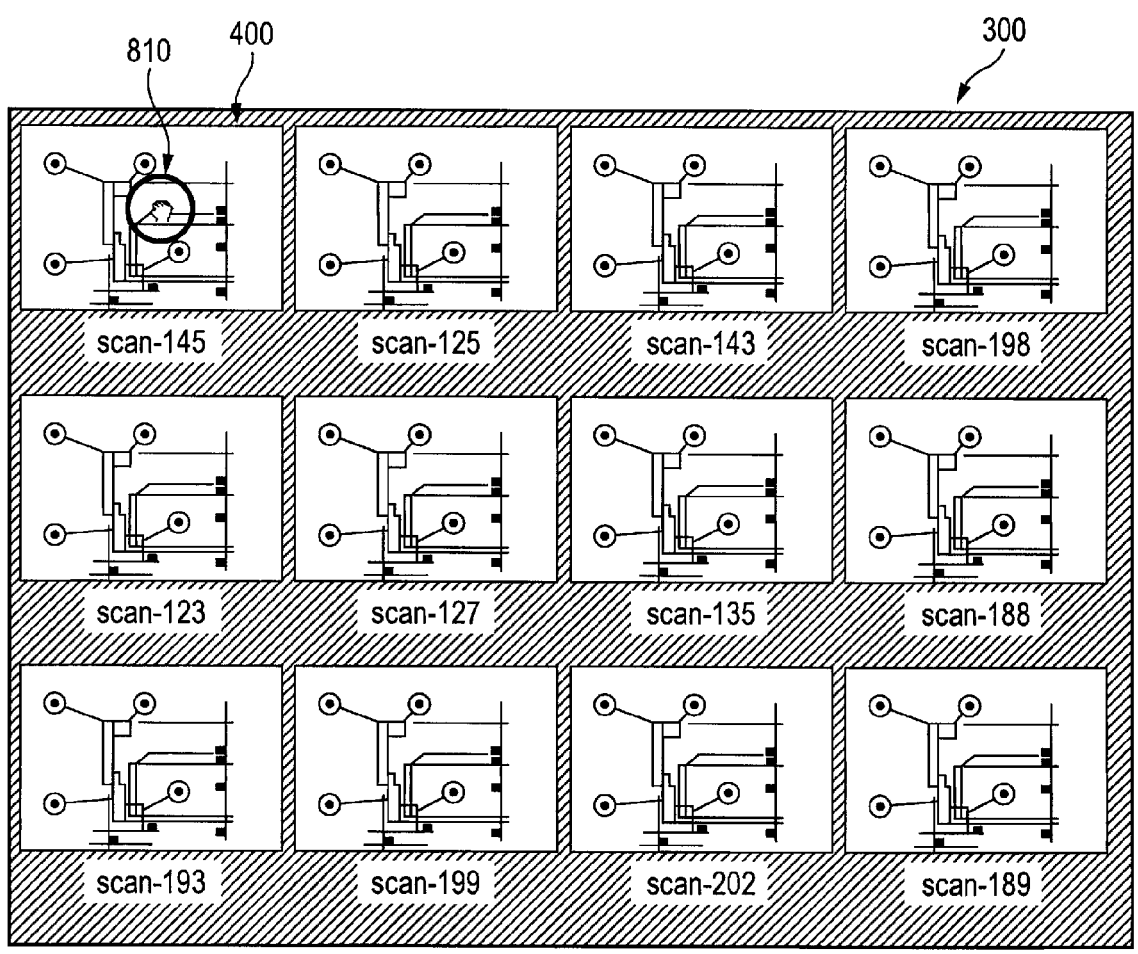
FIG. 9 is an explanatory view showing an example of display of images in a target region when region designation is performed.

FIG. 8 is an explanatory view showing an example of processing for designating a region for a thumbnail image. When a region designation mark 810 is dragged on the thumbnail image of the target document 400 by a user's operation after an enlarging ratio is designated by the region designation module 130, the partial region calculation module 140 may calculate a target region in the target document 400 in accordance with the movement of the region designation mark 810 so that an image of the region is created by the partial region image creation module 150 and displayed by the image display module 160. In display of any other document as well as display of the target document 400, the partial region calculation module 140 may calculate a target region in each document in the same manner so that an image of the region is created by the partial region image creation module 150 and displayed by the image display module 160. FIG. 9 is an explanatory view showing an example of display of images of a target region when the region is designated. That is, images of corresponding regions not only for the target document 400 for designating a region but also for other documents are displayed based on the region designation mark 810. Incidentally, the enlarging ratio may be a value designated by a user's operation or may be a predetermined value. Although processing by the partial region calculation module 140, the partial region image creation module 150 and the image display module 160 is performed not only for the target document 400 for designating a region but also for other documents in the middle of region designation, the processing may be applied to the region designation method shown in each of FIGS. 4, 6 and 7.

Figure 10:
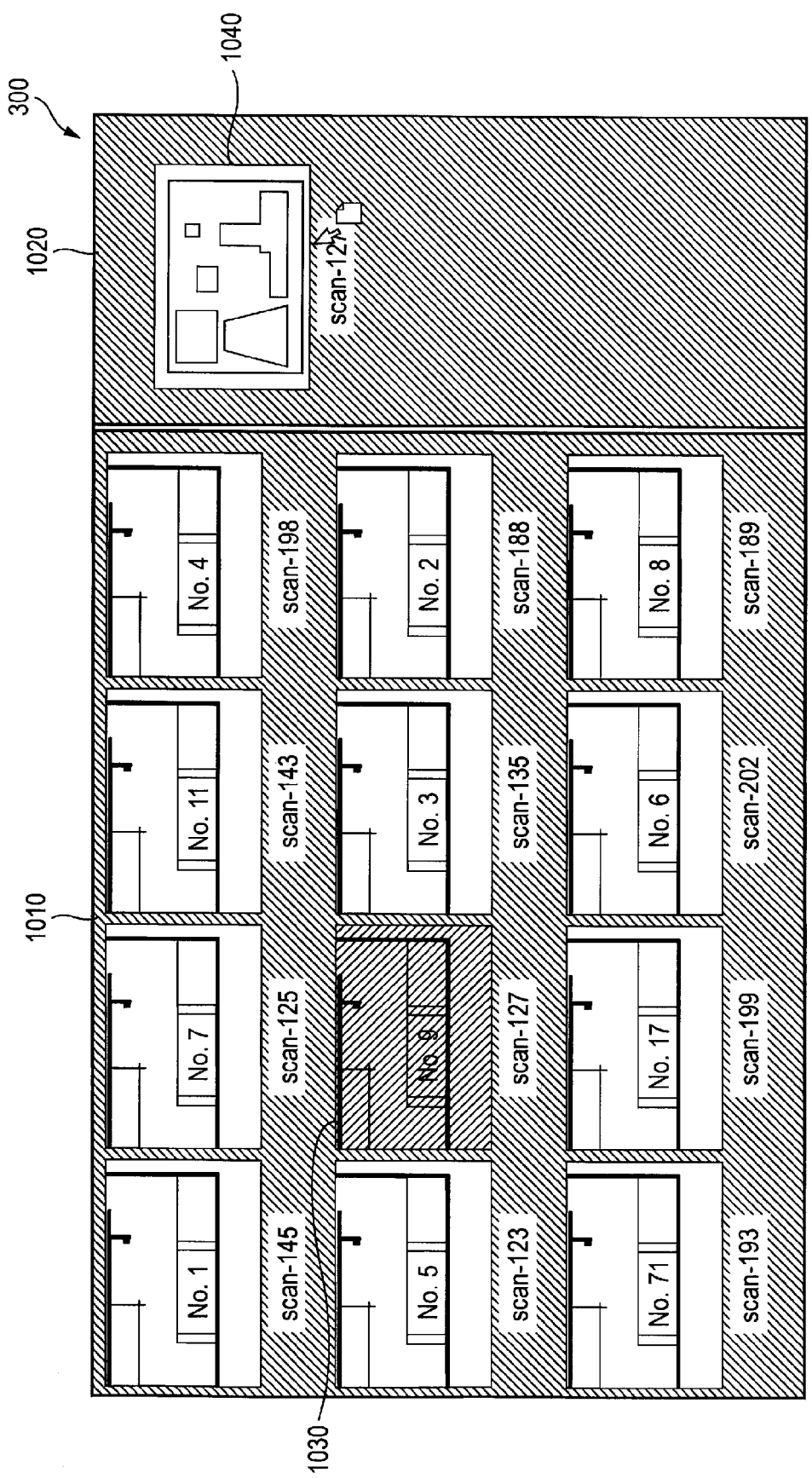
FIG. 10 is an explanatory view showing an example of display in the case where a document is copied to a non-target range.

FIG. 10 is an explanatory view showing an example of display in the case where a document is copied to a non-target range. This example shows the case where a target range 1010 and a non-target range 1020 are displayed on the screen 300 so that documents stored in a folder A can be displayed in the target range 1010 while documents stored in a folder B can be displayed in the non-target range 1020. FIG. 10 shows a state after a target document 1030 displayed in the target range 1010 is copied to the non-target range 1020 from a state where there is no document in the folder B (a state where no document is displayed in the non-target range 1020). In the target range 1010, not thumbnail images but images of regions created by the partial region image creation module 150 are displayed. Because the non-target range 1020 is in a default state where nothing is set, thumbnail images created by the reduced image creation module 120 are displayed in the non-target range 1020. That is, the partial region image creation module 150 (which may be replaced by the reduced image creation module 120 in this case) creates an image (thumbnail image in this case) of a region of a newly copied document in accordance with the display format information table 1300 of the destination document group (in this case, the display format information table 1300 for displaying a default thumbnail image because there is no display format information table 1300 of documents in the non-target range 1020), and the image display module 160 displays the image of the region.

When a document in the folder B (a target document 1040 displayed in the non-target range 1020) is conversely copied to the folder A (target range 1010), an image of a region equivalent to the other document group in the target range 1010 is displayed in the target range 1010 though the thumbnail image is displayed in the non-target range 1020. That is, the partial region image creation module 150 creates an image of a region of a newly copied document in accordance with the display format information table 1300 of the destination document group (the display format information table 1300 of documents in the target range 1010), and the image display module 160 displays the image of the region.

Figure 11:
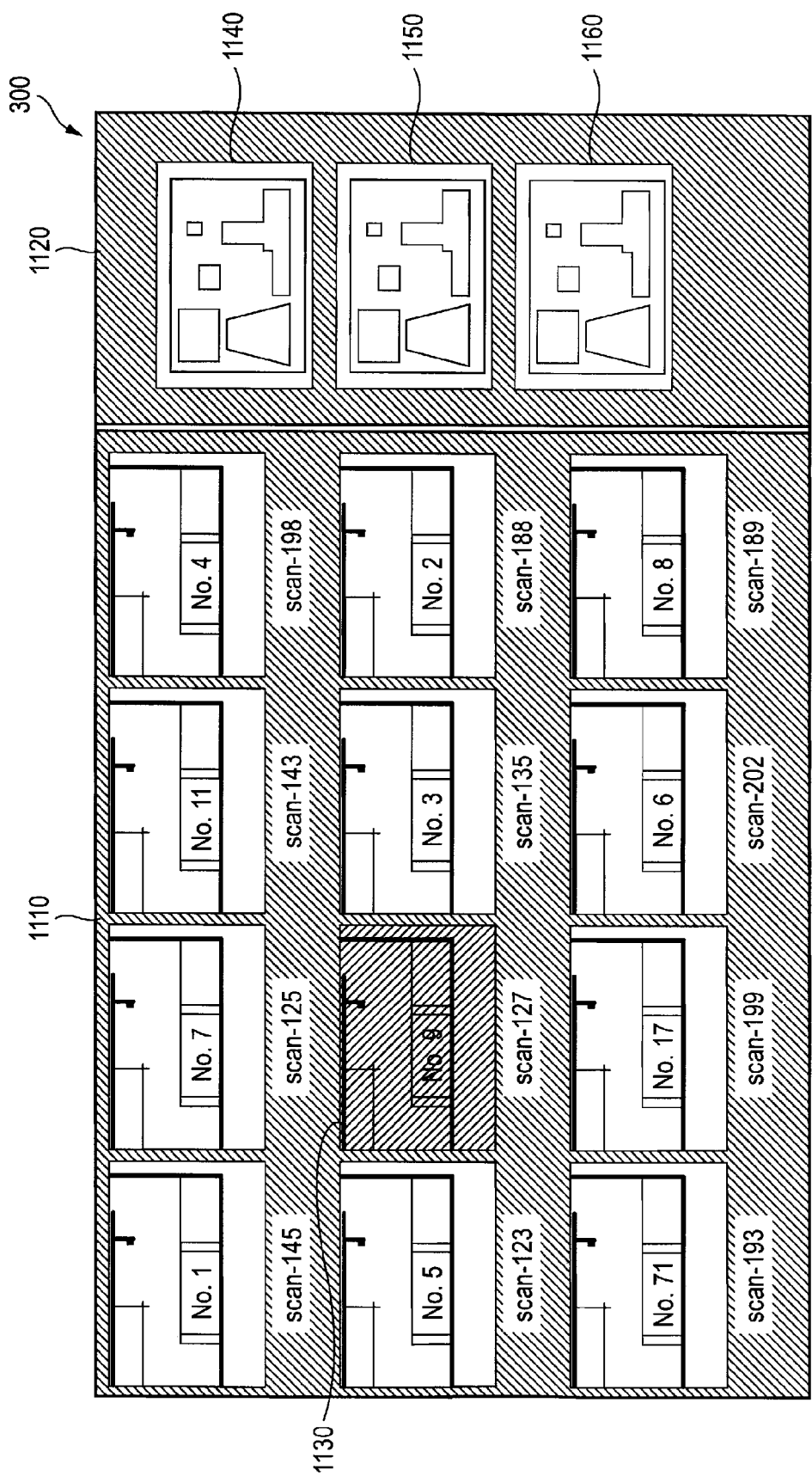
FIG. 11 is an explanatory view showing an example of display of thumbnail images in two target ranges.

FIG. 11 is an explanatory view showing an example of display of images of regions and thumbnail images in two target ranges. Images of designated regions are displayed in a target range 1110 while thumbnail images are displayed in a target range 1120. In this state, a target document 1130 in the target range 1110 is copied to the target range 1120.

Figure 12:
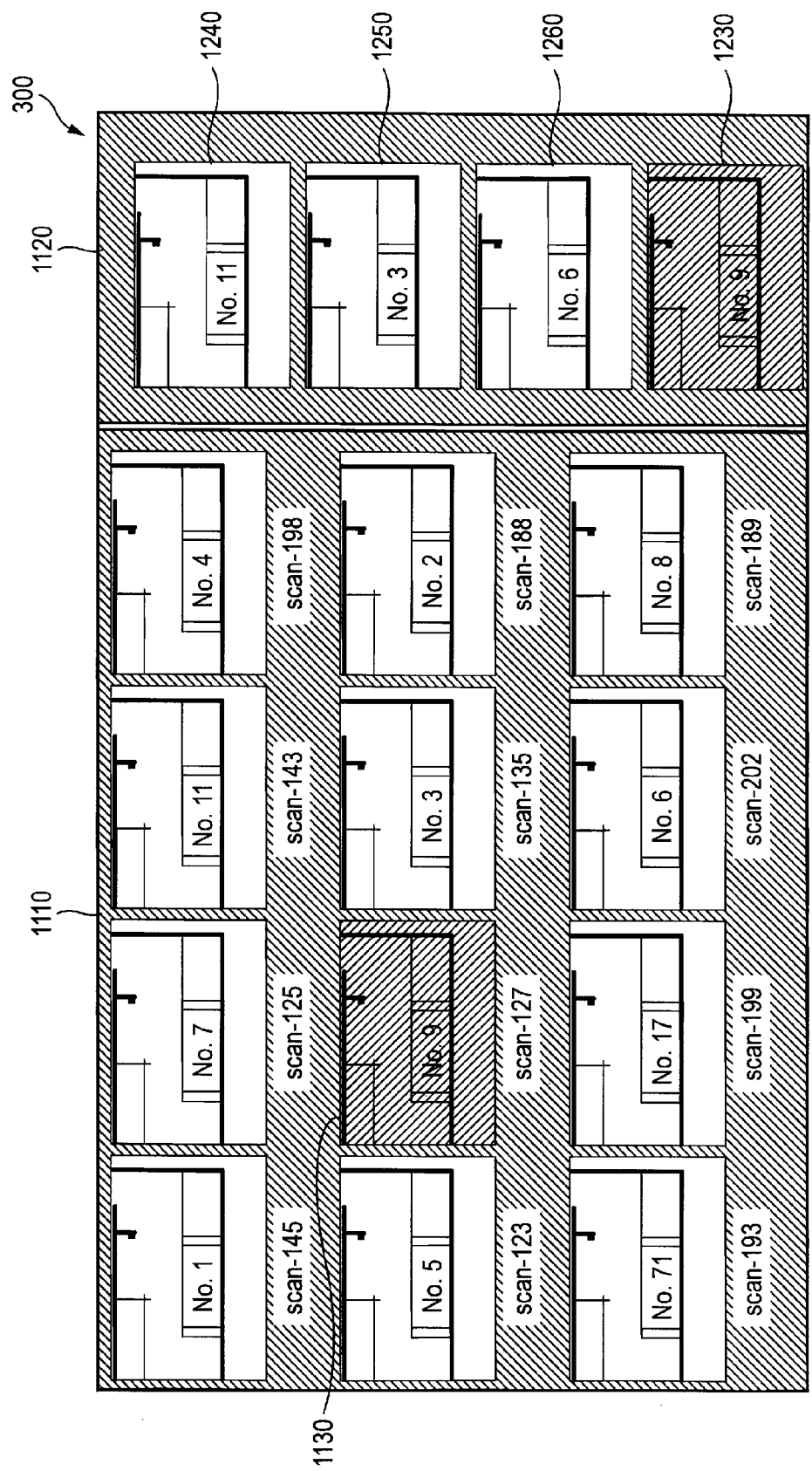
FIG. 12 is an explanatory view showing an example of display in the case where a document is copied from one target range to the other target range.

FIG. 12 is an explanatory view showing an example of display in the case where a document is copied from one target range to the other target range. That is, FIG. 12 shows a state after a target document 1130 is copied from a state shown in FIG. 11. Although the example of FIG. 10 shows the case where an image (an image of a designated range or a thumbnail image) for displaying the copied document is created and displayed in accordance with the display format information table 1300 of the destination document group, this example shows the case where display of the destination document group is changed in accordance with the display format information table 1300 of the copied document. That is, when a target document 1130 in the target range 1110 is copied to the target range 1120, the copied document is displayed (e.g. as a target document 1230 in FIG. 12) in the target range 1120 without change of the display format information table 1300 in the target range 1110, and documents 1140 to 1160 shown in FIG. 11 are displayed as images of regions equivalent to the target document 1130 (like documents 1240 to 1260 shown in FIG. 12) in place of the thumbnail images.

Figure 14:
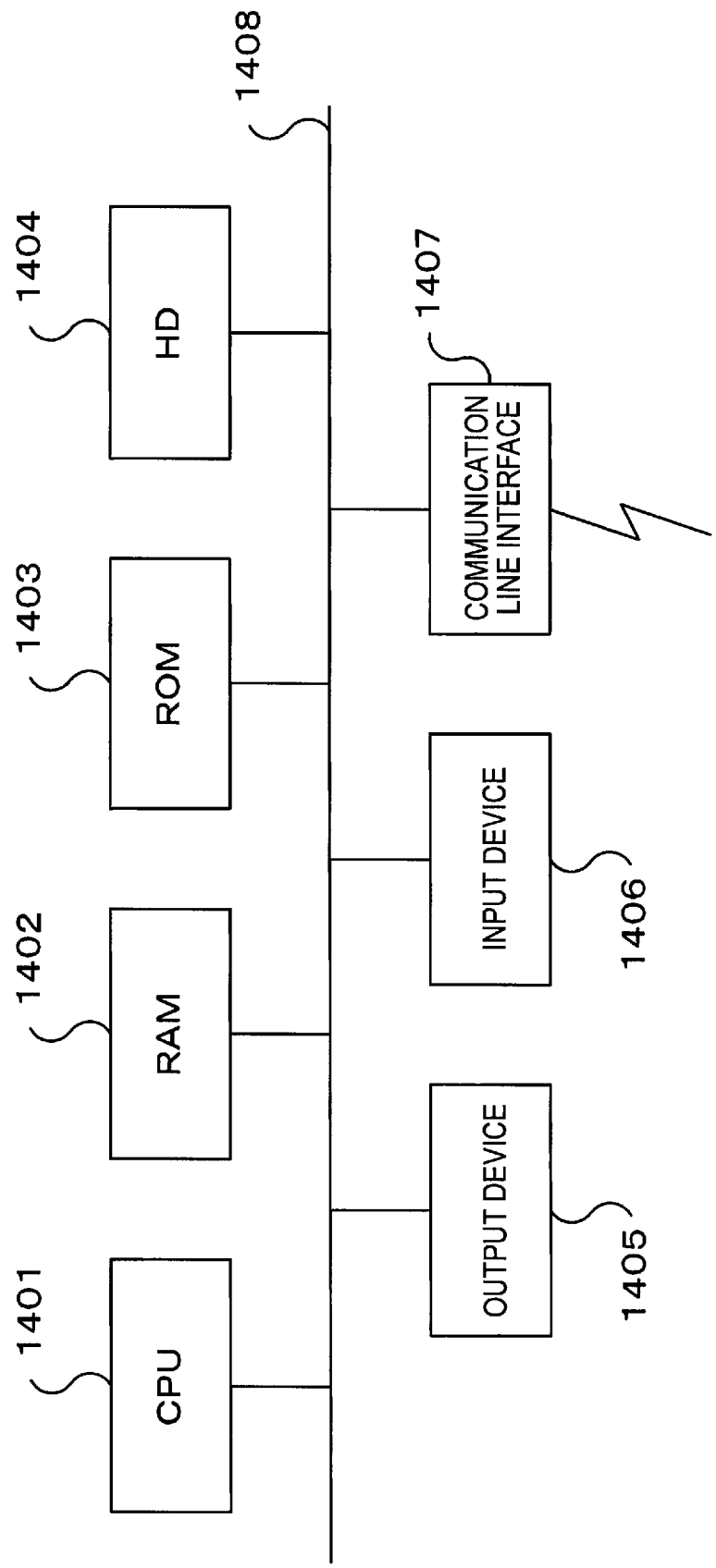
FIG. 14 is a block diagram showing an example of hardware configuration of a computer for achieving the embodiment.

Incidentally, the hardware configuration of a computer on which a program as the embodiment is executed is a general computer, specifically, a personal computer, a computer which can serve as a server, etc., as shown in FIG. 14. That is, as a specific example, a CPU 1401 is used as a processing portion (computing portion) and an RAM 1402, an ROM 1403 and an HD 1404 are used as storage devices. For example, a hard disk may be used as the HD 1404. The computer includes: the CPU 1401 which executes a program of the target document selection module 110, the reduced image creation module 120, the region designation module 130, the partial region calculation module 140, the partial region image creation module 150, etc.; the RAM 1402 which stores the program and data; the ROM 1403 which stores a program or the like for starting up this computer; the HD 1404 which is an auxiliary storage device; an input device 1406 such as a keyboard, a mouse, etc. which inputs data; an output device 1405 such as a CRT, a liquid crystal display, etc.; a communication line interface 1407 such as a network interface card, etc. for connection with a communication network; and a bus 1408 which connects these components to one another for data exchange. A plurality of computers configured as described above may be connected to one another by a network.

As for part of the aforementioned embodiment due to a computer program, a computer program which is software is loaded to the system of this hardware configuration so that software and hardware resources cooperate with each other to achieve the aforementioned embodiment.

Although the hardware configuration shown in FIG. 14 has been described as one configuration example, the embodiment is not limited to the configuration shown in FIG. 14 as long as configuration may be made so that the modules described in the embodiment can be executed. For example, part of the modules may be formed from dedicated hardware (e.g. ASIC). Part of the modules may be disposed in an external system so as to be connected by a communication line. A plurality of systems as shown in FIG. 14 may be connected to one another by a communication line so as to operate collaboratively with one another. Particularly, the system may be incorporated not only in the personal computer but also in any other apparatus such as an information home appliance, a copying machine, a facsimile machine, a scanner, a printer, a multifunctional machine (an image processing apparatus having at least two functions of a scanner, a printer, a copying machine, a facsimile machine, etc.) or the like.

Although the embodiment has been described in the case where images of regions are displayed as the images of documents displayed in the target range 1010 or the like, thumbnail images may be displayed as part of the documents. That is, images of regions created by the partial region image creation module 150 and thumbnail images created by the reduced image creation module 120 may be mixed in the target range 1010 or the like. However, in this case, the image display module 160 displays images of regions (e.g. surrounded by red frames) differently from thumbnail images to differentiate the images of regions from the thumbnail images.

Although the embodiment has been described in the case where display of images of regions is copied to another folder (folder with thumbnail images displayed) to thereby display thumbnail images, the region designation module 130 may accept an instruction to cancel display of images of regions without copying to the other folder so that the reduced image creation module 120 creates a thumbnail image of the document and the image display module 160 displays the thumbnail image.

Incidentally, the aforementioned program may be provided while stored in a storage medium or may be provided by a communication means. In this case, for example, the aforementioned program may be grasped as an invention of "a computer-readable recording medium on which a program is recorded".

The term "a computer-readable recording medium on which a program is recorded" means a recording medium which is used for installation, execution, distribution, etc. of a program and on which the program allowed to be read by a computer is recorded.

Examples of the recording medium include: "DVD-R, DVD-RW, DVD-RAM, etc." as digital versatile disks (DVD) based on standards defined by the DVD forum; "DVD+R, DVD+RW, etc." as digital versatile disks (DVD) based on standards defined by DVD+RW; CD read-only memory (CD-ROM), CD recordable (CD-R), CD rewritable (CD-RW), etc. as compact disks (CD); a Blue-ray Disc (registered trademark); a magneto-optical disk (MO); a flexible disk (FD); a magnetic tape; a hard disk; a read-only memory (ROM), an electrically erasable programmable read-only memory (EE-PROM); a flash memory; a random access memory (RAM); etc.

The program or part of the program may be saved or distributed while stored in the recording medium. Alternatively, the program or part of the program may be transmitted through a transmission medium such as a wire network or a wireless communication network used in Local Area Network (LAN), Metropolitan Area Network (MAN), Wide Area Network (WAN), Internet, Intranet, Extranet, etc. or a combination thereof. Or the program or part of the program may be carried with a carrier.

The program may be part of another program or may be recorded together with a different program on the recording medium. The program may be recorded separately on a plurality of recording media. The program may be recorded in any format such as compression or encryption as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to execute units comprising:
   a document acceptance unit that accepts a plurality of documents;
   a reduction and display unit that reduces and displays the documents accepted by the document acceptance unit;
   a region designation unit that designates a region within one of the documents displayed by the reduction and display unit;
   a region image creation unit that creates images corresponding to the region designated by the region designation unit for each of the documents accepted by the document acceptance unit based on a size of each of the documents displayed by the reduction and display unit; and
   a region image display unit that displays the images created by the region image creation unit in respective document positions corresponding to the documents displayed by the reduction and display unit,
   wherein:
      the region designation unit displays a shape as a region designation mark,
      a position of the region designation mark is manipulable to designate the region,
      the region designation unit designates the region within one of the documents in accordance with a manipulation of the region designation mark,
      the region image creation unit creates the images of the region designated by the region designation unit, during the manipulation of the region designation mark, and
      the region image display unit displays the images created by the region image creation unit of the region designated by the region designation unit, during the manipulation of the region designation mark.

2. The information processing apparatus according to claim 1, wherein
   at least one of the documents accepted by the document acceptance unit has a plurality of pages, and
   the region image creation unit creates an image of a region in a corresponding page of each document when the region designated by the region designation unit is on a second page or on a page after the second page.

3. The information processing unit according to claim 1, wherein
   the region image creation unit creates an image of a corresponding region in each rotated document when the region designated by the region designation unit is a region in the rotated document.

4. The information processing unit according to claim 1, wherein
   the document acceptance unit includes a first document acceptance unit which accepts a plurality of documents as a first document group, and a second document acceptance unit which accepts a plurality of documents as a second document group, and
   when a document of the image displayed by the region image display unit is copied or moved from the first document group to the second document group, the region image display unit displays an image of said document of the first document group in the second document group.

5. The information processing apparatus according to claim 4, wherein
   when a document of the image displayed by the region image display unit is copied or moved from the first document group to the second document group, the region image creation unit creates images equivalent to the region where the copied or moved document is displayed, for the second document group except the copied or moved document in the second document group, and
   the region image display unit displays the images created by the region image creation unit in the second document group.

6. The information processing apparatus according to claim 1, wherein
   the document acceptance unit includes a first document acceptance unit which accepts a plurality of documents as a first document group, and a second document acceptance unit which accepts a plurality of documents as a second document group,
   when a document is copied or moved from the second document group to the first document group indicated by images displayed by the region image display unit, the region image creation unit creates an image corresponding to a region designated by the region designation unit in the first document group for said document being copied or moved to the first document group, and
   the region image display unit displays the image created by the region image creation unit in the first document group.

7. An information processing method comprising:
   accepting a plurality of documents;
   reducing and displaying the accepted documents;
   designating a region within one of the displayed documents;
   creating images corresponding to the designated region for each of the accepted documents based on a size of each of the displayed documents; and
   displaying the created images in respective document positions corresponding to the displayed documents,
   wherein:
      the designating the region comprises displaying a shape as a region designation mark,
      a position of the region designation mark is manipulable to designate the region,
      the region is designated within one of the documents in accordance with a manipulation of the region designation mark,
      the creating the images comprises creating the images of the designated region, during the manipulation of the region designation mark, and
      the displaying the created images comprises displaying the images of the designated region, during the manipulation of the region designation mark.

8. A non-transitory computer readable medium storing a program causing a computer to execute a process for information processing, the process comprising:
   accepting a plurality of documents;
   reducing and displaying the accepted documents;
   designating a region within one of the displayed documents;
   creating images corresponding to the designated region for each of the accepted documents based on a size of each of the displayed documents; and
   displaying the created images in respective document positions corresponding to the displayed documents,
   wherein:
      the designating the region comprises displaying a shape as a region designation mark,
      a position of the region designation mark is manipulable to designate the region, the region is designated within one of the documents in accordance with a manipulation of the region designation mark, the creating the images comprises creating the images of the designated region, during the manipulation of the region designation mark, and the displaying the created images comprises displaying the images of the designated region, during the manipulation of the region designation mark.

* * * * *